(12) United States Patent
Eo et al.

(10) Patent No.: US 9,758,157 B2
(45) Date of Patent: Sep. 12, 2017

(54) APPARATUS AND METHOD FOR ACTIVE VIBRATION CONTROL OF HYBRID VEHICLE

(71) Applicant: HYUNDAI MOTOR COMPANY, Seoul (KR)

(72) Inventors: Jeong Soo Eo, Hwaseong-si (KR); Sung Jae Kim, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/263,917

(22) Filed: Sep. 13, 2016

(65) Prior Publication Data

US 2017/0166189 A1     Jun. 15, 2017

(30) Foreign Application Priority Data

Dec. 10, 2015  (KR) .................. 10-2015-0176326

(51) Int. Cl.
*B60W 20/00*    (2016.01)
*B60W 20/17*    (2016.01)
(Continued)

(52) U.S. Cl.
CPC ............ *B60W 20/17* (2016.01); *B60W 30/20* (2013.01); *B60W 40/12* (2013.01);
(Continued)

(58) Field of Classification Search
CPC ...... B60W 20/17; B60W 40/12; B60W 30/20; B60W 2510/0638; B60W 2510/081;
(Continued)

(56) References Cited

U.S. PATENT DOCUMENTS

| 6,102,144 A * | 8/2000 | Lutz .................. | B60K 6/48 180/65.25 |
| 6,246,952 B1 * | 6/2001 | Honda ................ | F02P 5/152 123/406.38 |

(Continued)

FOREIGN PATENT DOCUMENTS

| JP | 2008-024022 A | 2/2008 |
| JP | 2014-073773 A | 4/2014 |

(Continued)

*Primary Examiner* — Tyler J Lee
(74) *Attorney, Agent, or Firm* — Brinks Gilson & Lione (57) ABSTRACT

A method for active vibration control of a hybrid electric vehicle may include: determining by a controller whether a driving mode enters an idle region based on a motor speed or an engine speed; selecting a reference angle signal based on position information of a motor or an engine when the driving mode enters the idle region; setting up a period of fast Fourier transform (FFT) and performing FFT of the engine speed or the motor speed corresponding to the period of the FFT from the reference angle signal; setting up a reference spectrum according to the engine speed and an engine load; extracting vibration components based on the reference spectrum; summing vibration components according to frequencies and performing inverse FFT; determining an amplitude ratio according to the engine speed and the engine load; and performing active vibration control of each frequency based on the amplitude ratio and motor torque.

15 Claims, 9 Drawing Sheets

(51) Int. Cl.
*B60W 30/20* (2006.01)
*B60W 40/12* (2012.01)

(52) U.S. Cl.
CPC . *B60W 2400/00* (2013.01); *B60W 2510/0638* (2013.01); *B60W 2510/081* (2013.01); *B60W 2510/083* (2013.01); *B60W 2710/083* (2013.01); *B60Y 2300/20* (2013.01); *B60Y 2306/09* (2013.01); *Y10S 903/903* (2013.01)

(58) Field of Classification Search
CPC ..... B60W 2510/083; B60W 2710/083; B60W 2400/00; Y10S 903/903; B60Y 2300/20; B60Y 2306/09
USPC .......................................................... 701/22
See application file for complete search history.

(56) References Cited

U.S. PATENT DOCUMENTS

| | | | |
|---|---|---|---|
| 7,633,257 B2 | 12/2009 | Sakamoto et al. | |
| 9,533,672 B2* | 1/2017 | Christ | B60W 10/08 |
| 2012/0078456 A1* | 3/2012 | Hakumura | B60L 3/003 |
| | | | 701/22 |

FOREIGN PATENT DOCUMENTS

| | | |
|---|---|---|
| JP | 2014-217215 A | 11/2014 |
| KR | 10-2010-0064603 A | 6/2010 |

* cited by examiner

APPARATUS AND METHOD FOR ACTIVE VIBRATION CONTROL OF HYBRID VEHICLE

CROSS-REFERENCE TO RELATED APPLICATION

This application claims priority to and the benefit of Korean Patent Application No. 10-2015-0176326, filed on Dec. 10, 2015, the entire contents of which are incorporated herein by reference.

FIELD

The present disclosure relates to an apparatus and a method for active vibration control of a hybrid electric vehicle.

BACKGROUND

The statements in this section merely provide background information related to the present disclosure and may not constitute prior art.

A hybrid vehicle is a vehicle using two or more different kinds of power sources, and is generally a vehicle that is driven by an engine that obtains a driving torque by burning fuel and a motor that obtains a driving torque with battery power.

Hybrid electric vehicles can be provided with optimum output torque, depending on how the engine and the motor are operated while the vehicles are driven by the two power sources, that is, the engine and the motor.

Hybrid electric vehicles may form various structures using the engine and the motor as power sources, and hybrid electric vehicles are classified as a TMED (Transmission Mounted Electric Device) type, in which the engine and the motor are connected by an engine clutch and the motor is connected to the transmission, and an FMED (Flywheel Mounted Electric Device) type, in which the motor is directly connected to a crankshaft of the engine and connected to the transmission through a flywheel.

From among these, since the FMED type of the hybrid electric vehicle is very noisy and has severe vibration, and vibration reduction is being studied. A method of frequency analysis which extracts the vibration component is normally used for this.

An analog method using a band pass filter has been used in a conventional frequency analysis, wherein the analog method of analysis determines whether or not a frequency is abnormal based on an amplitude of each expected point of a frequency band.

However, we have discovered that distinguishing between the vibration component of the engine and the vibration of the noise component is difficult, and unnecessary overcontrol of the vibration negatively affects the control efficiency and energy management. Further, we have found that because it is only possible to create and synchronize a reference signal with respect to a specific frequency in the conventional frequency analysis, comprehensive and active control of other frequencies which may be additionally generated is not performed.

The above information disclosed in this Background section is only for enhancement of understanding of the background of the present disclosure and therefore it may contain information that does not form the prior art that is already known to a person of ordinary skill in the art.

SUMMARY

The present disclosure provides an apparatus and a method for active vibration control of a hybrid electric vehicle, having advantages of elaborately controlling an abnormal vibration component through an entire frequency spectrum analysis using FFT (fast Fourier transform) and reflecting a change of a surrounding frequency component in real time by feedback.

A method for active vibration control of a hybrid electric vehicle according to one form of the present disclosure may include: determining by a controller whether a driving mode enters an idle region based on a motor speed or an engine speed; detecting by the controller an engine speed or a motor speed; selecting by the controller a reference angle signal based on position information of a motor or an engine when the driving mode enters the idle region; setting up by the controller a period of fast Fourier transform (FFT) and performing FFT of the engine speed or the motor speed corresponding to the period of the FFT from the reference angle signal; setting up by the controller a reference spectrum according to an engine speed and an engine load; extracting vibration components to be removed based on information of the reference spectrum; summing by the controller vibration components to be removed according to the frequencies and performing inverse FFT; determining by the controller an amplitude ratio based on the engine speed and the engine load; and performing by the controller active vibration control of each frequency based on the information of the amplitude ratio and the motor torque.

The reference angle signal may be set by dividing by a number (m) of resolver poles based on information of the position of the motor or set up between a top dead center (TDC) and a bottom dead center (BDC) of a number one cylinder or a number four cylinder based on information of the position of the engine.

The FFT period may be set in consideration of a cylinder and a stroke of the engine.

The analysis of the FFT signal may calculate a magnitude and phase information of each frequency.

The frequency component that the FFT signal is greater than the reference spectrum may be selected as the vibration component to be removed.

The vibration component to be removed may be removed by outputting the motor torque corresponding to an inverse value of a value by multiplying the reference signal created by inverse FFT, the motor torque and the basic amplitude ratio.

The driving mode may enter the idle region when the motor speed or the engine speed is less than a predetermined speed, and an engine load is less than a predetermined load An apparatus for active vibration control of a hybrid electric vehicle including an engine and a motor as a power source according to another form of the present disclosure may include: a position sensor configured to detect position information of the engine or the motor; and a controller configured to select a reference angle signal on the basis of a signal from the position sensor, perform fast Fourier transform (FFT) of engine speed or motor speed, extract a vibration component to be removed through the FFT analysis, and perform active vibration control of each frequency by performing inverse FFT when a driving mode enters an idle region.

The controller may set up a reference spectrum according to an engine speed and an engine load, and extracts the vibration component to be removed by comparing the reference spectrum with the FFT signal.

The controller may sum the vibration components to be removed according to frequencies, and generate a reference signal by performing inverse FFT.

The controller may remove the vibration component by outputting the motor torque corresponding to an inverse value of a value by multiplying the reference signal created by inverse FFT, the motor torque and the basic amplitude ratio.

The controller may set up the reference angle signal by dividing by a number (m) of resolver poles based on information of the position of the motor or set up the reference angle signal between a top dead center (TDC) and a bottom dead center (BDC) of a number one cylinder or a number four cylinder based on information of the position of the engine.

The controller may set up an FFT period in consideration of a cylinder and stroke of the engine, and analyzes the FFT signal by a calculated magnitude and phase information of each frequency.

The controller may determine that the driving mode enters the idle region when the motor speed or the engine speed is less than a predetermined speed, and an engine load is less than a predetermined load.

As described above, according to the present disclosure, the vibration may be actively controlled, because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, the adjustment amounts of vibration and a frequency which is an object of the vibration control may be controlled individually, so it is possible to inhibit or prevent inefficiency of the control when the vibration is over-removed. And since the active vibration control is performed during an idle region, it is possible to reduce unnecessary energy consumption. Therefore, the exact and efficient active vibration control can be performed through real-time feedback control.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that some of the methods may be executed by at least one controller. The term "controller" refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion, e.g., by a telematics server or a controller area network (CAN).

Figure 1:
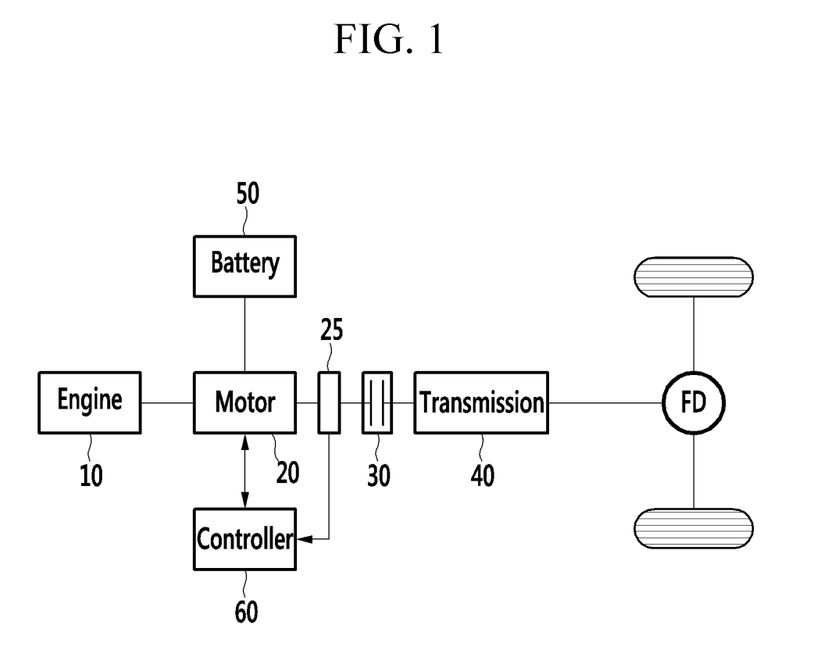
FIG. 1 is a schematic block diagram of an apparatus for active vibration control of a hybrid electric vehicle according to one form of the present disclosure.

FIG. 1 is a schematic block diagram of an apparatus for active vibration control of a hybrid electric vehicle according to one form of the present disclosure.

As shown in FIG. 1, an apparatus for active vibration control of a hybrid electric vehicle includes an engine 10, a motor 20, a position sensor 25, a clutch 30, a transmission 40, a battery 50, and a controller 60.

The engine 10 generates power by burning fuel as a power source while turned on. The engine 10 may be various disclosed engines such as a gasoline engine or a diesel engine using conventional fossil fuel. The rotation power generated from the engine 10 is transmitted to the transmission 40 side through the clutch 30.

The motor 20 is operated by a 3-phase AC voltage applied from the battery 50 through an inverter to generate torque, and operates as a power generator and supplies regenerative energy to the battery 50 in a coast-down mode.

In one form, the motor 20 may be directly connected to the crankshaft of the engine 10.

The position sensor 25 detects position information of the engine 10 or the motor 20. The position information of the engine 10 or the motor 20 are transmitted to the controller 60. That is, the position sensor 25 may include a crankshaft position sensor that detects a phase of the crankshaft or a motor position sensor that detects a position of a stator and a rotor of the motor. The controller 60 may calculate an engine speed by differentiating the rotation angle detected by the crankshaft position sensor, and a motor speed may be calculated by differentiating the position of the stator and the rotor of the motor detected by the motor position sensor. The position sensor 25 may be additional speed sensor (not shown) for measuring the engine speed or the motor speed.

The clutch 30 is disposed between the motor 20 connected to the crankshaft of the engine 10 and the transmission 40, and switches power delivery to the transmission 40. The clutch 30 may be a hydraulic pressure type of clutch or a dry-type clutch.

The transmission 40 adjusts a shift ratio according to a vehicle speed and a running condition, distributes an output torque by the shift ratio, and transfers the output torque to the driving wheel, thereby enabling the vehicle to run. The transmission 40 may be an automatic transmission (AMT) or a dual clutch transmission (DCT).

The battery 50 is formed with a plurality of unit cells, and a high voltage for providing a driving voltage to the motor 20 is stored at the battery 50. The battery 50 supplies the driving voltage to the motor 20 depending on the driving mode, and is charged by the voltage generated from the motor 20 in the regenerative braking.

The controller 60 selects a reference angle signal on the basis of a signal from the position sensor, performs fast Fourier transform (FFT), extracts a vibration component to be removed via the FFT analysis, and performs active vibration control of each frequency by performing inverse FFT when the driving mode enters an idle region based on the motor speed or the engine speed.

That is, the controller 60 sets up a reference spectrum based on a speed and load of the engine, extracts a vibration component of each frequency by comparing the reference spectrum with the FFT signal analysis result, and generates a reference signal by performing inverse FFT after selecting and summing a removal object frequency from each frequency vibration through FFT analysis. The reference signal may mean an inverse FFT signal of the vibration components to be removed according to frequencies.

For these purposes, the controller 60 may be implemented as at least one processor that is operated by a predetermined program, and the predetermined program may be programmed in order to perform each step of a method for active vibration control of a hybrid electric vehicle.

Various forms described herein may be implemented within a recording medium that may be read by a computer or a similar device by using software, hardware, or a combination thereof, for example.

According to hardware implementation, the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, forms such as procedures and functions described in the present forms may be implemented by separate software modules. Each of the software modules may perform one or more functions and operations described in the present disclosure. A software code may be implemented by a software application written in an appropriate program language.

Figure 2:
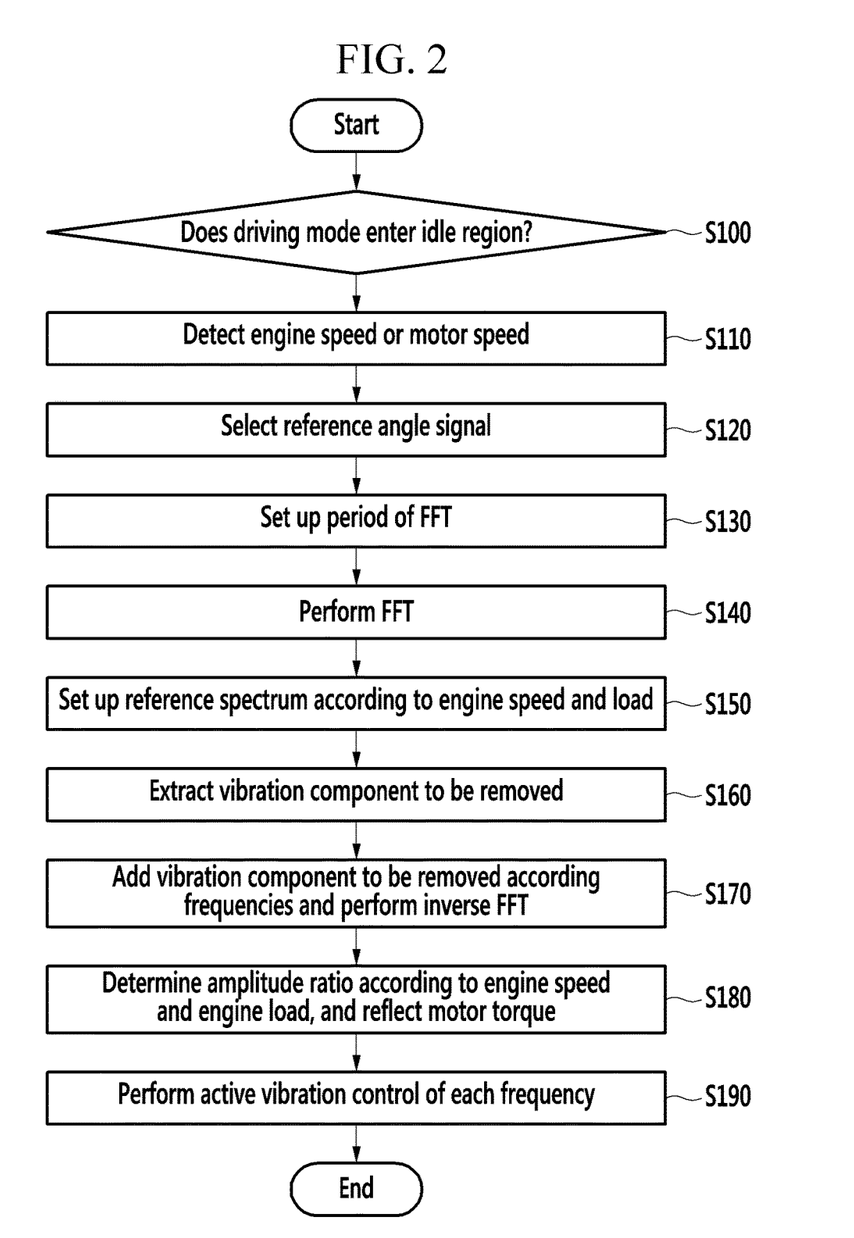
FIG. 2 is a flowchart illustrating a method for active vibration control of a hybrid electric vehicle according to one form of the present disclosure.
Figure 3:
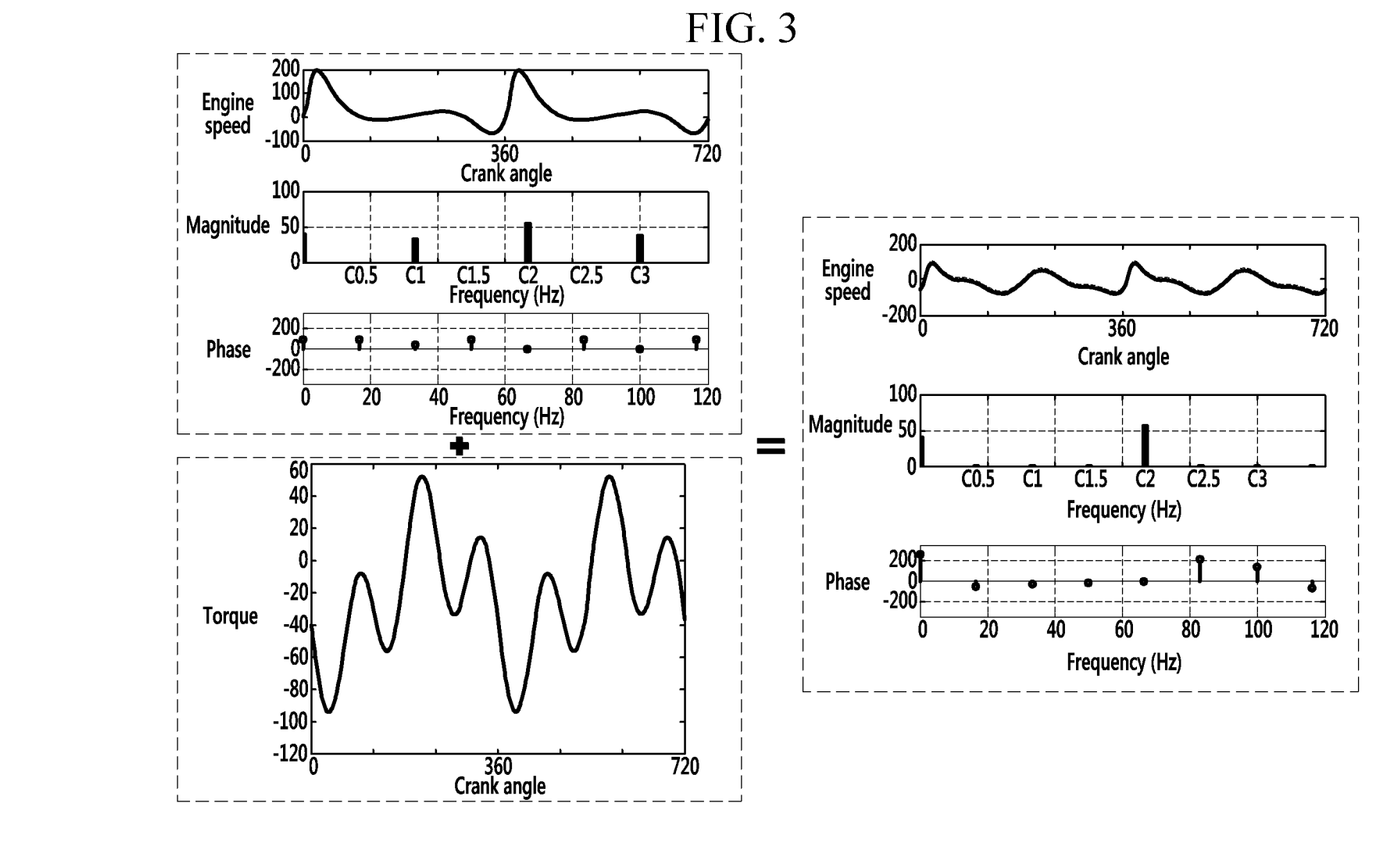
FIG. 3 is a drawing illustrating vibration reduction to which a method for active vibration control of a hybrid electric vehicle is applied according to the present disclosure.

FIG. 2 is a flowchart illustrating a method for active vibration control of a hybrid electric vehicle, and FIG. 3 is a drawing illustrating vibration reduction to which a method for active vibration control of a hybrid electric vehicle is applied.

As shown in FIG. 2, an active vibration control method of the hybrid electric vehicle is started when the controller determines whether a driving mode enters an idle region at step S100.

The controller 60 may determine that the driving mode enters the idle region when a motor speed or an engine speed is less than a predetermined speed, and an engine load is less than a predetermined load.

Figure 4A:
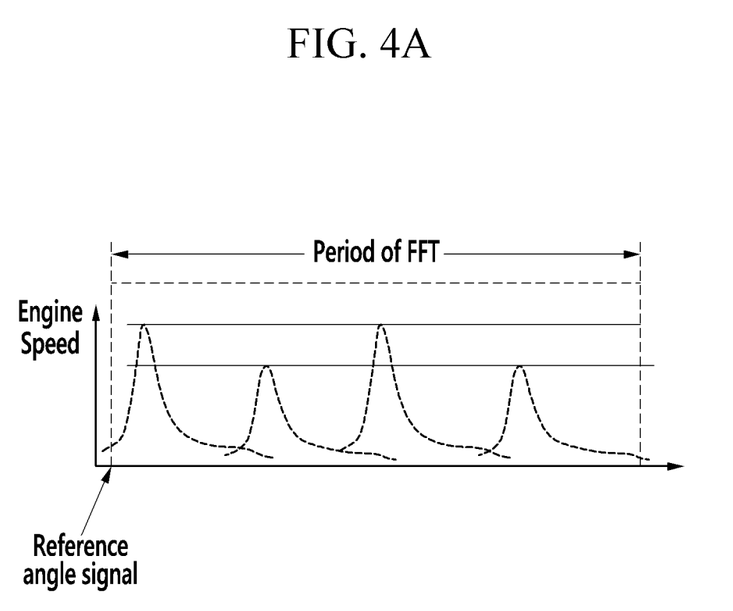
FIG. 4A to 4F are graphs for explaining a method for active vibration control of a hybrid electric vehicle according to the present disclosure.

When the driving mode enters the idle region, the position sensor 25 detects position information of the engine 10 or the motor 20, and in step S110, the controller 60 may detect engine speed or motor speed using the position information of the engine 10 or the motor 20 (refer to FIG. 4A). In step S120, the controller 60 selects the reference angle signal based on the signal of the position sensor 25. That is, the controller 60 selects the reference angle signal according to information of positions of the engine 10 and the motor 30 (refer to FIG. 4A).

The controller 60 may set up the reference angle signal by dividing by a number (m) of resolver poles based on information of the position of the motor 20, or may set up the reference angle signal between top dead center (TDC) of the number one cylinder and bottom dead center (BDC) of the number four cylinder based on information of the position of the engine 10. For example, the controller 60 may select the reference angle signal based on the information of the position of the motor 20, and may create the reference angle signal by dividing 16 poles signal into eight (8). The reference angle signal means a start point for performing FFT.

After that, in step S130, the controller 60 sets up a period of the FFT for performing the FFT. The controller 60 may set up the entire period in consideration of a cylinder and stroke of the engine 10. For example, if the engine 10 has four cylinders and four strokes, the crank angle may be 720 degrees.

When the FFT period is set up in the step S130, the controller 60 analyzes the FFT signal in step S140. That is, the controller 60 performs the FFT of the engine speed or the motor speed corresponding to the period of the FFT from the reference angle signal (refer to FIG. 4B). The controller 60 may calculate magnitude and phase information of each frequency by analyzing the FFT signal.

Figure 4B:
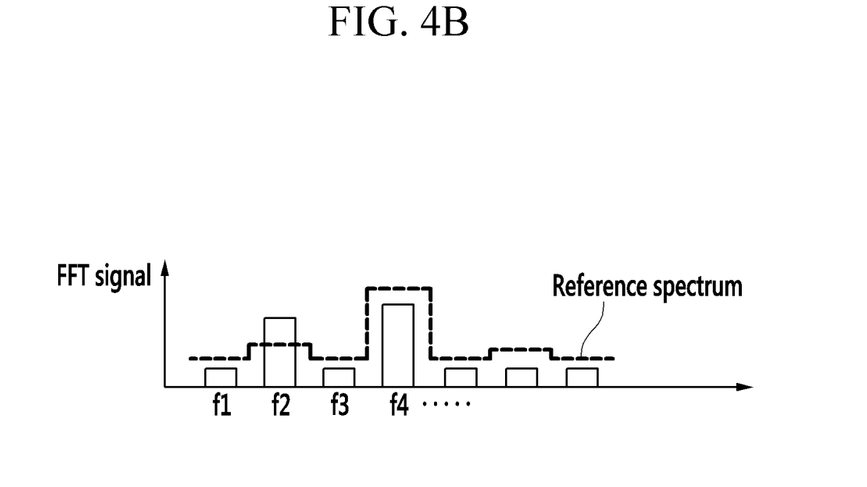

In addition, in step S150, the controller 60 sets up a reference spectrum according to the engine speed and load (refer to FIG. 4B). That is, the controller 60 may set up a vibration reference value of each frequency according to an operating point of the engine.

When the reference spectrum is set up in the step S150, the controller 60 extracts a vibration component to be removed by comparing the FFT signal with the reference spectrum in step S160. That is, the controller 60 may select an object desired vibration control in a compared result value of the FFT analysis and the predetermined vibration reference value. The controller 60 may extract the frequency component that the FFT signal is greater than the reference spectrum as the vibration component to be removed. For example, referring to FIG. 4B, f2 frequency component may be selected as a frequency component to be removed.

Figure 4C:
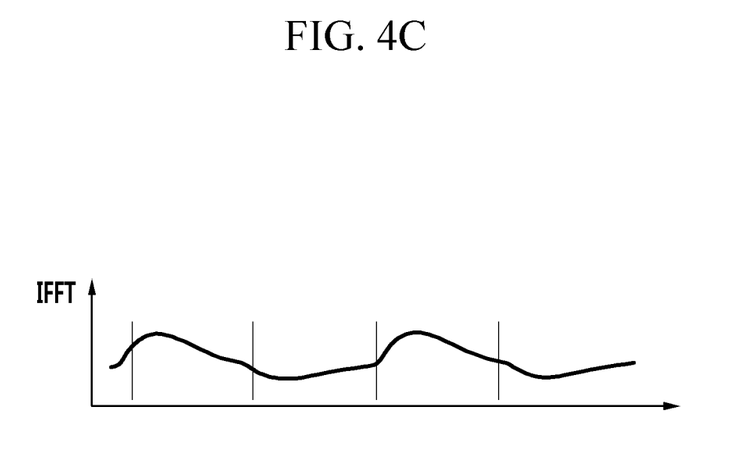

When the vibration components to be removed is selected in the step S160, the controller 60, in step S170, sums the vibration components to be removed according to frequencies, and performs inverse FFT to create a reference signal (refer to FIG. 4C). As described above, the reference signal means inverse FFT signal of the vibration components to be removed.

In addition, the controller 60 determines an amplitude ratio according to an engine speed and an engine load, and reflects a motor torque in step S180. That is, the controller 60 may input the amplitude ratio and the motor torque according to an operating point of the engine into the reference signal generated by the inverse FFT. Herein, the amplitude ratio according to the engine speed and the engine load may be determined in advance by a predetermined map.

Figure 4D:
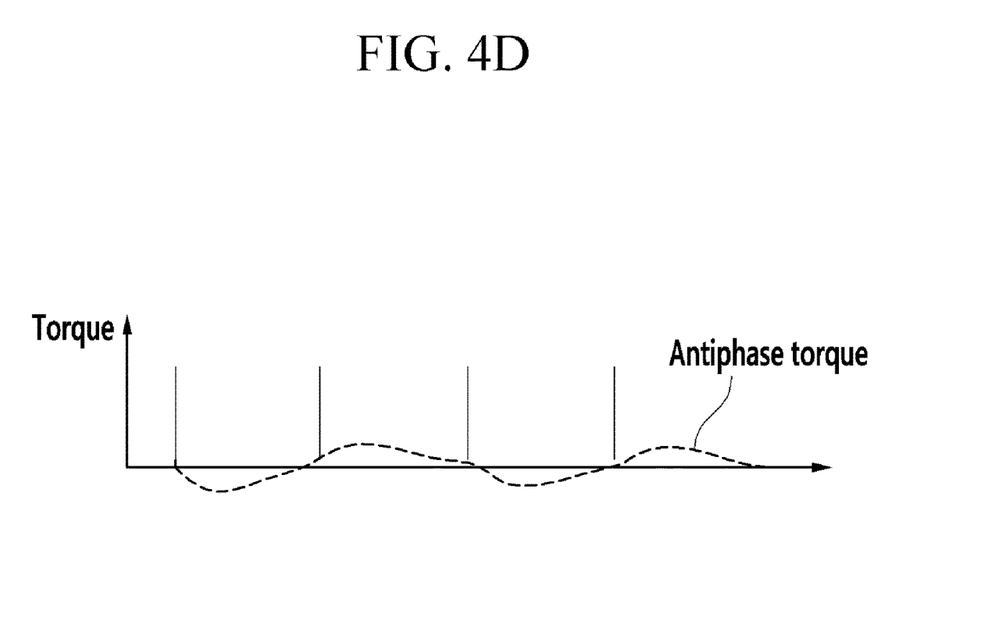
Figure 4E:
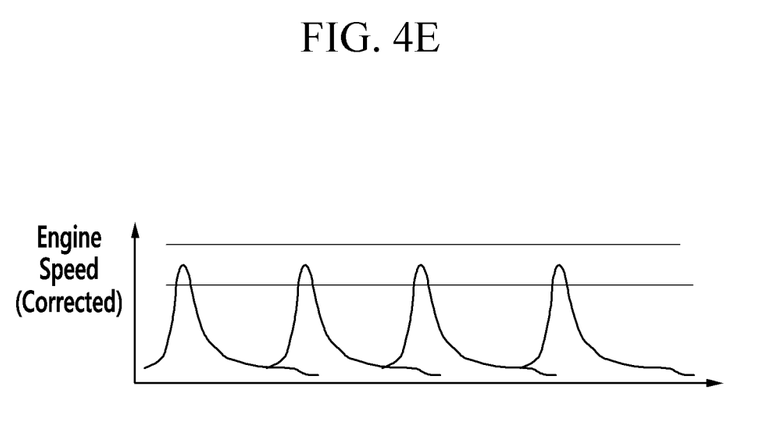
Figure 4F:
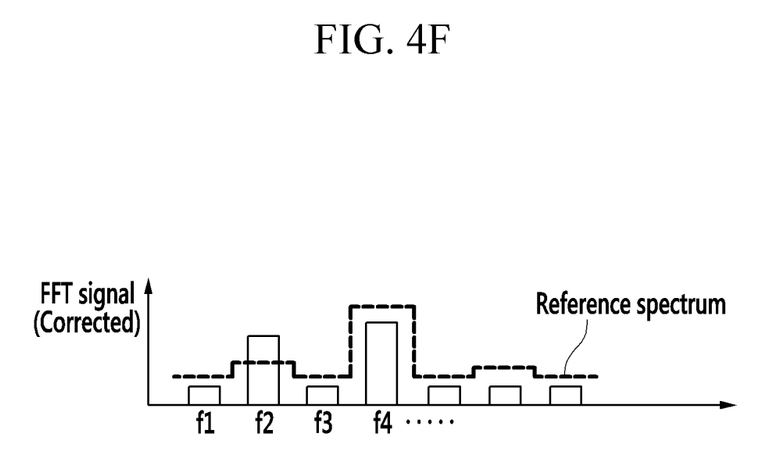

After that, the controller 60 performs active vibration control of each frequency based on the amplitude ratio and the motor torque in step S190. That is, the controller 60 may remove all the positive components and negative components of the vibration components by outputting the motor torque corresponding to an inverse value of a value by multiplying the reference signal created by inverse FFT, the motor torque and the basic amplitude ratio (refer to FIG. 4D). Since the reference signal is expressed as speed according to time, the controller 60 removes the vibration components to be removed by reflecting the motor torque and the basic amplitude ratio to the reference signal and transforming the reference signal to torque component. That is, as shown in FIGS. 4E and 4F, it is possible to control the engine speed or the motor speed that the frequency components corresponding to the reference spectrum are remained.

FIG. 3 is a drawing illustrating vibration reduction to which a method for active vibration control of a hybrid electric vehicle is applied.

Referring to FIG. 3, a magnitude and phase of vibration components of each frequency calculated by performing FFT analysis is illustrated in left upper side of the drawing, and anti-phase torque values which overlap the component of vibration to be removed as indicated is illustrated in left lower side of the drawing.

That is, the vibration components of each frequency and the anti-phase torque as described in left side can be reflected, thereby it can be controlled such that the object to be removed is removed and a desired vibration component remains as described in right side.

As described above, according to the exemplary form of the present disclosure, the vibration may be actively controlled, because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, the adjustment amounts of vibration and a frequency which is an object of the vibration control may be controlled individually, so it is possible to inhibit or prevent inefficiency in the control when the vibration is over-removed. And since the active vibration control is performed during an idle region, it is possible to reduce unnecessary energy consumption. Therefore, the exact and efficient active vibration control can be performed through real-time feedback control.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method for active vibration control of a hybrid electric vehicle, comprising:
    determining, by a controller, whether a driving mode enters an idle region based on a motor speed or an engine speed;
    detecting, by the controller, the engine speed or the motor speed;
    selecting, by the controller, a reference angle signal based on position information of a motor or an engine when the driving mode enters the idle region;
    setting up, by the controller, a period of fast Fourier transform (FFT) and performing the FFT of the engine speed or the motor speed corresponding to a period of the FFT from the reference angle signal;
    setting up, by the controller, a reference spectrum according to the engine speed and an engine load;
    extracting, by the controller, vibration components to be removed based on information of the reference spectrum;
    summing, by the controller, the vibration components to be removed according to frequencies and performing inverse FFT;
    determining, by the controller, an amplitude ratio according to the engine speed and the engine load; and
    performing, by the controller, active vibration control of each frequency based on information of the amplitude ratio and a motor torque.

2. The method of claim 1, wherein the controller calculates the reference angle signal by dividing by a number (m) of resolver poles based on information of the position of the motor or sets up the reference angle signal between a top dead center (TDC) and a bottom dead center (BDC) of a number one cylinder or a number four cylinder based on information of the position of the engine.

3. The method of claim 1, wherein the FFT period is set in consideration of a cylinder and a stroke of the engine.

4. The method of claim 1, wherein an analysis of the FFT signal calculates a magnitude and phase information of each frequency.

5. The method of claim 1, wherein a frequency component of which a FFT signal is greater than the reference spectrum is selected as the vibration component to be removed.

6. The method of claim 1, wherein the vibration component to be removed is removed by outputting a motor torque corresponding to an inverse value of a value by multiplying a reference signal created by inverse FFT, the motor torque and a basic amplitude ratio.

7. The method of claim 1, wherein the driving mode enters the idle region when the motor speed or the engine speed is less than a predetermined speed, and an engine load is less than a predetermined load.

8. An apparatus for active vibration control of a hybrid electric vehicle including an engine and a motor as a power source, the apparatus comprising:
    a position sensor configured to detect position information of the engine or the motor; and
    a controller configured to select a reference angle signal based on a signal from the position sensor, perform fast Fourier transform (FFT) of an engine speed or a motor speed, extract a vibration component to be removed through FFT analysis, and perform active vibration control of each frequency by performing inverse FFT when a driving mode enters an idle region.

9. The apparatus of claim 8, wherein the controller sets up a reference spectrum according to the engine speed and an engine load, and extracts the vibration component to be removed by comparing a reference spectrum with a FFT signal.

10. The apparatus of claim 8, wherein the controller sums the vibration components to be removed according to frequencies, and generates a reference signal by performing inverse FFT.

11. The apparatus of claim 8, wherein the controller determines an amplitude ratio based on the engine speed and an engine load, and performs active vibration control of each frequency by reflecting the amplitude ratio and an motor torque.

12. The apparatus of claim 11, wherein the controller removes the vibration component by outputting a motor torque corresponding to an inverse value of a value by multiplying a reference signal created by inverse FFT, the motor torque and a basic amplitude ratio.

13. The apparatus of claim 8, wherein the controller sets up the reference angle signal by dividing by a number (m) of resolver poles based on information of the position of the motor or sets up the reference angle signal between a top dead center (TDC) and a bottom dead center (BDC) of a number one cylinder or a number four cylinder based on information of the position of the engine.

14. The apparatus of claim 8, wherein the controller sets up an FFT period in consideration of a cylinder and stroke of the engine, and analyzes a FFT signal by a calculated magnitude and phase information of each frequency.

15. The apparatus of claim 8, wherein
the controller determines that the driving mode enters the idle region when the motor speed or the engine speed is less than a predetermined speed, and an engine load is less than a predetermined load.

* * * * *